(12) United States Patent
Aldana

(10) Patent No.: US 9,900,859 B2
(45) Date of Patent: *Feb. 20, 2018

(54) DOUBLE SIDED ROUND TRIP TIME CALIBRATION

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,751

(22) Filed: Sep. 8, 2017

(65) Prior Publication Data

US 2017/0374639 A1 Dec. 28, 2017

Related U.S. Application Data

(63) Continuation of application No. 15/185,849, filed on Jun. 17, 2016, now Pat. No. 9,794,906.

(60) Provisional application No. 62/314,845, filed on Mar. 29, 2016.

(51) Int. Cl.
*H04W 64/00* (2009.01)
*H04L 12/26* (2006.01)

(52) U.S. Cl.
CPC ......... *H04W 64/00* (2013.01); *H04L 43/0864* (2013.01)

(58) Field of Classification Search
CPC . G01S 5/02; G01S 5/0252; G01S 5/14; G01S 19/14; H04L 29/08657; H04L 29/08108; H04L 29/08936; H04W 4/02; H04W 64/00; H04W 48/04; H04M 1/72572; H04M 1/72577

See application file for complete search history.

(56) References Cited

U.S. PATENT DOCUMENTS

| | | | | |
|---|---|---|---|---|
| 5,058,200 A | * | 10/1991 | Huang | G01S 5/02 455/446 |
| 5,502,450 A | * | 3/1996 | Zablotney | G01S 3/46 342/451 |
| 8,135,413 B2 | * | 3/2012 | Dupray | H04W 4/02 455/456.1 |
| 9,185,676 B2 | * | 11/2015 | Kangas | G01S 5/0226 |
| 9,237,546 B1 | * | 1/2016 | Zhang | H04W 64/00 |
| 9,794,906 B1 | | 10/2017 | Aldana et al. | |
| 2012/0315919 A1 | | 12/2012 | Hirsch | |

(Continued)

OTHER PUBLICATIONS

International Search Report and Written Opinion—PCT/US2017/020131—ISA/EPO—Jun. 19, 2017.

*Primary Examiner* — Sharad Rampuria
(74) *Attorney, Agent, or Firm* — Hunter Clark PLLC

(57) ABSTRACT

Techniques for determining a Round Trip Time (RTT) calibration value are disclosed. An example of a method according to the disclosure includes receiving a fine timing measurement (FTM) exchange between an initiating station and a responding station, calculating a plurality of differential round trip time (RTT) measurements based on the FTM exchange, calculating a responding station calibration value based on the plurality of differential RTT measurements, and transmitting the responding station calibration value to the responding station.

26 Claims, 10 Drawing Sheets

(56) References Cited

U.S. PATENT DOCUMENTS

| | | | |
|---|---|---|---|
| 2014/0187259 A1* | 7/2014 | Kakani | H04W 64/00 |
| | | | 455/456.1 |
| 2014/0286324 A1 | 9/2014 | Aldana et al. | |
| 2014/0286384 A1 | 9/2014 | Mestre Pons et al. | |
| 2014/0295877 A1* | 10/2014 | Hart | H04W 4/02 |
| | | | 455/456.1 |
| 2015/0063138 A1 | 3/2015 | Aldana et al. | |
| 2015/0181553 A1 | 6/2015 | Segev | |
| 2015/0382152 A1 | 12/2015 | Lindskog et al. | |
| 2016/0081054 A1 | 3/2016 | Zhang et al. | |
| 2016/0150500 A1 | 5/2016 | Agrawal et al. | |
| 2016/0277890 A1 | 9/2016 | Nallampatti Ekambaram et al. | |

* cited by examiner

DOUBLE SIDED ROUND TRIP TIME CALIBRATION

CROSS-REFERENCE TO RELATED APPLICATIONS

This application is a continuation of U.S. patent application Ser. No. 15/185,849 entitled "DOUBLE SIDED ROUND TRIP TIME CALIBRATION," filed on Jun. 17, 2016, which claims the benefit of and priority to provisional U.S. Application Ser. No. 62/314,845 entitled "DOUBLE SIDED ROUND TRIP TIME CALIBRATION," filed Mar. 29, 2016, which are assigned to the assignee hereof and the contents of which are incorporated herein by reference in their entirety.

BACKGROUND

Embodiments of the inventive subject matter generally relate to the field of wireless communication and, more particularly, to calibration techniques for passive positioning in wireless communication networks.

Various positioning techniques can be employed for determining the position of a wireless communication device (e.g., a wireless local area network (WLAN) device) based on receiving wireless communication signals. For example, positioning techniques can be implemented that utilize time of arrival (TOA), the round trip time (RTT) of wireless communication signals, received signal strength indicator (RSSI), or the time difference of arrival (TDOA) of the wireless communication signals to determine the position of a wireless communication device in a wireless communication network. These positioning techniques are dependent on precise time measurements and therefore may be sensitive to variations in hardware and/or software configurations of the wireless communication devices. The accuracy of the positioning results may vary, for example, based on device model, software version, or manufacturer.

SUMMARY

An example of a method for determining a round trip time calibration value with a mobile device according to the disclosure includes receiving a fine timing measurement (FTM) exchange between an initiating station and a responding station, calculating a plurality of differential round trip time (RTT) measurements based on the FTM exchange, calculating a responding station calibration value based on the plurality of differential RTT measurements, and transmitting the responding station calibration value to the responding station.

Implementations of such a method may include one or more of the following features. A median of the plurality of differential RTT measurements may be calculated, and the responding station calibration value may be based on the median of the plurality of differential RTT measurements. The responding station calibration value may be transmitted to the responding station via a wireless communication with the responding station. The responding station calibration value may be provided to a network server. Sn initiating station calibration value may be received from the initiating station. The initiating station calibration value may be transmitted to the responding station. The initiating station calibration value may be provided to a network server.

An example of a method for providing calibrated timestamp values in a fine timing measurement (FTM) exchange according to the disclosure includes receiving a fine timing measurement (FTM) request message from an initiating station, transmitting a plurality of uncalibrated FTM messages to the initiating station, such that the plurality of uncalibrated FTM messages include uncalibrated timestamp values, receiving a responding station calibration value from a client station, and transmitting a plurality of calibrated FTM messages to the initiating station, such that the plurality of calibrated FTM messages include calibrated timestamp values based on the responding station calibration value.

Implementations of such a method may include one or more of the following features. Receiving the responding station calibration value from the client station may include receiving a wireless transmission from the client station. Receiving the responding station calibration value from the client station may include receiving the responding station calibration value from a network server. A distance to the initiating station is twice a distance to the client station. The responding station calibration value may be transmitted to the initiating station.

An example of an apparatus for determining a round trip time calibration value according to the disclosure includes a memory unit, a wireless transceiver, a processing unit operably coupled to the memory unit and the wireless transceiver, and configured to receive a fine timing measurement (FTM) exchange between an initiating station and a responding station, calculate a plurality of differential round trip time (RTT) measurements based on the FTM exchange, calculate a responding station calibration value based on the plurality of differential RTT measurements, and transmit the responding station calibration value to the responding station.

Implementations of such an apparatus may include one or more of the following features. The processing unit may be further configured to calculate a median of the plurality of differential RTT measurements and to calculate the responding station calibration value based on the median of the plurality of differential RTT measurements. The processing unit may be configured to transmit the responding station calibration value to the responding station via a wireless communication with the responding station. The processing unit may be configured to transmit the responding station calibration value to the responding station by providing the responding station calibration value to a network server. The processing unit may be further configured to receive an initiating station calibration value from the initiating station. The processing unit may be further configured to transmit the initiating station calibration value to the responding station. The processing unit may be further configured to provide the initiating station calibration value to a network server.

An example of an apparatus for providing calibrated timestamp values in a fine timing measurement (FTM) exchange according to the disclosure includes a memory, a transceiver, at least one processor operably coupled to the memory and the transceiver and configured to receive a fine timing measurement (FTM) request message from an initiating station, transmit a plurality of uncalibrated FTM messages to the initiating station, such that the plurality of uncalibrated FTM messages include uncalibrated timestamp values, receive a responding station calibration value from a client station, and transmit a plurality of calibrated FTM messages to the initiating station, such that the plurality of calibrated FTM messages include calibrated timestamp values based on the responding station calibration value.

Implementations of such an apparatus may include one or more of the following features. The at least one processor may be configured to receive the responding station calibration value from the client station via a wireless transmission from the client station. The at least one processor may be configured to receive the responding station calibration value from the client station comprises by receiving the responding station calibration value from a network server. A distance to the initiating station is twice a distance to the client station. The at least one processor may be further configured to transmit the responding station calibration value to the initiating station.

An example of an apparatus for determining a round trip time calibration value according to the disclosure includes means for receiving a fine timing measurement (FTM) exchange between an initiating station and a responding station, means for calculating a plurality of differential round trip time (RTT) measurements based on the FTM exchange, means for calculating a responding station calibration value based on the plurality of differential RTT measurements, and means transmitting the responding station calibration value to the responding station.

An example of an apparatus for providing calibrated timestamp values in a fine timing measurement (FTM) exchange according to the disclosure includes means for receiving a fine timing measurement (FTM) request message from an initiating station, means for transmitting a plurality of uncalibrated FTM messages to the initiating station, such that the plurality of uncalibrated FTM messages include uncalibrated timestamp values, means for receiving a responding station calibration value from a client station, and means for transmitting a plurality of calibrated FTM messages to the initiating station, such that the plurality of calibrated FTM messages include calibrated timestamp values based on the responding station calibration value.

An example of a non-transitory processor-readable storage medium comprising instruction for determining a round trip time calibration value with a mobile device according to the disclosure includes code for receiving a fine timing measurement (FTM) exchange between an initiating station and a responding station, code for calculating a plurality of differential round trip time (RTT) measurements based on the FTM exchange, code for calculating a responding station calibration value based on the plurality of differential RTT measurements, and code for transmitting the responding station calibration value to the responding station.

An example of a non-transitory processor-readable storage medium comprising instruction for providing calibrated timestamp values in a fine timing measurement (FTM) exchange according to the disclosure code for receiving a fine timing measurement (FTM) request message from an initiating station, code for transmitting a plurality of uncalibrated FTM messages to the initiating station, such that the plurality of uncalibrated FTM messages include uncalibrated timestamp values, code for receiving a responding station calibration value from a client station, and code for transmitting a plurality of calibrated FTM messages to the initiating station, such that the plurality of calibrated FTM messages include calibrated timestamp values based on the responding station calibration value.

Items and/or techniques described herein may provide one or more of the following capabilities, as well as other capabilities not mentioned. Access points including microelectronic components (e.g., chip sets) from different vendors may be used in a wireless local area network (WLAN). An initiating station, including microelectronic components from a first manufacturer, may initiate a Fine Timing Measurement (FTM) exchange with a responding station, such that the responding station includes microelectronic components from a second manufacturer. A mobile device may be used to detect a calibration error associated with the responding station. The mobile device may relay calibration information to the responding station. The responding station may apply the calibration information to FTM timestamp values (e.g., T1, T4). The initiating station may receive the calibrated FTM timestamp values and determine a calibration error associated with its own FTM timestamp values (e.g, T2, T3). The calibration error information may be propagated to other access points in a WLAN. The calibration information associated with the respective access points may persist in one or more position servers. Increased position accuracy in a WLAN comprising access points from different manufacturers may be realized. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1A:
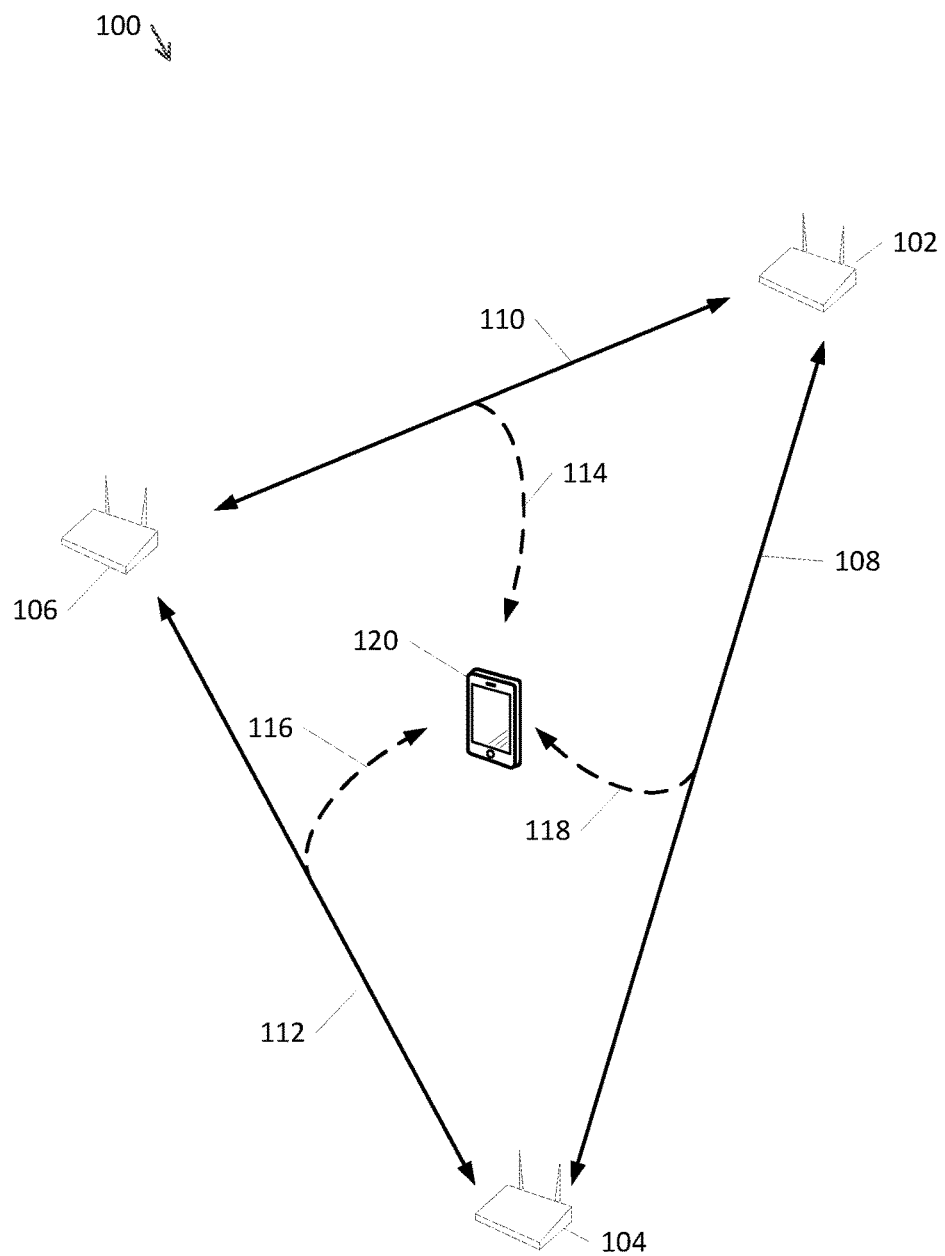
FIG. 1A is an example block diagram of a client station intercepting FTM messages.

The description that follows includes exemplary systems, methods, techniques, instruction sequences, and computer program products that embody techniques of the present inventive subject matter. However, it is understood that the described embodiments may be practiced without these specific details. For instance, although examples refer to a double sided round trip time calibration scheme for wireless local area network (WLAN) devices, embodiments are not so limited. In other embodiments, the calibration scheme can be implemented by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of a client station (e.g., mobile phone users) and operators of the wireless communication network. In some systems, round-trip time (RTT) techniques can be implemented for determining the position of the client station. For example, an access point can transmit a request message to multiple other access points and can receive a response message from each of the other access points. The range between the each of the access points can be determined by measuring the round trip time between the request messages and the corresponding response messages. In some systems, time difference of arrival (TDOA) techniques can be implemented for determining the position of a client station. For example, the client station can determine its position based on the difference between the ranges from each of the access points to the client station. The accuracy of the position estimate is based on the accuracy of the timing information associated with the message exchange. The timing of the messages can be impacted by hardware and/or software configurations of the transmitting and receiving access points. For example, the microelectronics (e.g., chip sets) within an access point may cause delays in processing the FTM messages used in a RTT calculation. As a result of these differences, the accuracy of position estimates generated in a network including access points with chip sets from different manufacturers may be reduced. Further, these differences may increase the operational difficulty associated with determining calibration values for the network stations.

A position calculation unit of a client station may be configured to determine the position of the client station based on intercepted FTM messages (i.e., passive positioning). The access points in the wireless communication network can be configured to exchange fine timing messages (e.g., on-demand or periodically) with one or more neighboring access points (i.e., a target access point) in the wireless communication network. An access point may determine RTT timing information associated with the one or more neighboring access points based on the time difference between a message (M) transmitted and a corresponding acknowledgment (ACK) response message transmitted by the target access point. The position calculation unit in a client station may intercept the message (M) and the corresponding ACK message, and may determine TDOA timing information based on the time difference of arrival between the message (M) and the corresponding ACK message. The access points may also transmit an RTT measurement message comprising the RTT timing information to the client station. The position calculation unit may then determine the position of the client station based, at least in part, on the TDOA timing information, the RTT timing information, and position information associated with a predetermined number of network access points. The FTM message information received by the client station may be used to determine calibration data for the access points participating in the FTM exchange.

Referring to FIG. 1A, an example block diagram of a client station intercepting FTM messages is shown. The diagram includes a wireless communication network 100 comprising three access points 102, 104, 106, and a client station 120. The access points 102, 104, 106 may be an advanced WLAN access points capable of determining their own positions (e.g., a self-locating access point). Each of the access points can perform a FTM exchange with one or more other access points in the wireless communication network 100 (e.g., within the communication range of one another). In some implementations, access points can be arranged that one access point can be designated as a master access point, and the other access points can be designated as target access points. The access points 102, 104, 106 may be from different manufacturers and may include different hardware and software configurations. The client station 120 can be any suitable electronic device (e.g., a notebook computer, a tablet computer, a netbook, a mobile phone, a gaming console, a personal digital assistant (PDA), inventory tag, etc.) with WLAN communication capabilities. Furthermore, in FIG. 1A, the client station 120 is within the communication range of one or more access points 102, 104, 106.

The first access point 102 transmits a periodic fine timing message (M) to one or more of the other access points 104, 106. The message M can comprise an identifier associated with the first access point (e.g., a network address of the first access point 102), an identifier associated with a second access point (e.g., a network address of the second access point 104), a sequence number that identifies the fine timing message, and timestamp information indicating the time instant at which the message M was transmitted. Typically, the timestamp information includes an error component. The first access point 102 receives a fine timing acknowledgment message (ACK) from one or more access points 104, 106 and determines RTT timing information associated with each of the access points 104, 106. In response to receiving the message M, the second access point (e.g., the second access point 104 in this example) can generate and transmit a corresponding acknowledgment ACK response message. In one implementation, the ACK message indicates receipt of the message M at the second access point 104. The ACK message can comprise the identifier associated with the first access point 102, the identifier associated with the second access point 104, and the sequence number that identifies the corresponding fine timing request message, and a timestamp indicating the time instant at which the ACK message was transmitted. If the second access point 104 is from a different manufacturer, or includes different hardware (e.g., chip sets), then the error component of the timestamp may be different than the error component associated with the timestamps generated by the first access point 102.

The first access point 102 can receive the ACK response message from the second access point 104, determine the time instant at which the ACK message was received, and determine the RTT timing information associated with the second access point 104. The first access point 102 can determine the RTT timing information associated with the second access point 104 as the time difference between the time instant at which the message M was transmitted and the time instant at which the ACK response message was received. In the example of FIG. 1A, the first access point 102 can exchange fine timing message/ACK response messages 108 with the second access point 104, and also can exchange fine timing message/ACK response messages 110 with another access point 106. The second access point 104 also can exchange fine timing message/ACK response messages 112 with another access point 106. Each of the access points 102, 104, 106 can determine and may relay the RTT timing information associated with the other access points in a network.

The client station 120 can intercept the M messages and the ACK response messages to determine TDOA timing information associated with the access points 102, 104, 106. The dashed lines 114, 116, 118 represent the client station 120 intercepting the fine timing message/ACK response messages 108, 110, 112 exchanged between the access points 102, 104, 106 (e.g, the AP cluster). The client station 120 can measure the arrival time difference between the M messages and the corresponding ACK response messages. For example, the client station 120 can determine a first time instant at which the message M (transmitted by the first access point 102 to the second access point 104) was detected. The client station 120 can also determine a second time instant at which the ACK message (transmitted by the second access point 104 to the first access point 102) was detected. The client station 120 can subtract the first time instant from the second time instant to determine the TDOA timing information associated with the first and second access points 102, 104.

In an embodiment, the access points 102, 104, 106 can transmit a RTT measurement control message comprising an indication of the RTT timing information, station calibration data, and/or AP position information. In one implementation, each of the access points 102, 104, 106 can broadcast a distinct RTT measurement control message for neighboring access points to indicate the RTT timing information associated with the neighboring access points. In addition to the RTT timing information associated with the access points, the RTT measurement control message can also comprise station calibration information, and the access point position information. The station calibration information may be associated with the transmit and receive delay errors associated with a respective access point. The access point position information can include an indication of the position of the broadcasting access point and an indication of the position of the neighboring access points. The client station 120 can receive the RTT measurement control message(s) and can store the calibration information, the access point position information, the TDOA timing information, and the RTT timing information associated with the access points 102, 104, 106, in a predetermined memory location, a data structure, or another suitable storage device.

In general, the client station 120 is configured to determine a position, at least in part, on the access point position information, the TDOA timing information, and the RTT timing information associated with the access points. In some implementations, as will be further described, the client station 120 can be used to determine calibration errors (e.g., transmit and receive delays) based on the FTM exchanges. The client station 120 may use the access point position information, the TDOA timing information, the calibration information, and the RTT timing information to construct a "positioning equation" in terms of the range between the client station 120 and each of the predetermined number of access points. For example, on determining that access point position information, the calibrated TDOA timing information (i.e., to account for transmit and receive delays associated with the access points), and the RTT timing information associated with three target access points are available, the client station 120 can solve three positioning equations to determine a three-dimensional position of the client station 120. It is noted that in other implementations, the client station 120 can determine a position based on the access point position information, the TDOA timing information, and the RTT timing information associated with any suitable number of access points. For example, a position can be based on two independent positioning equations from the access point position information, the TDOA timing information, and the RTT timing information associated with two target access points to determine a two-dimensional position of the client station 120.

Figure 1B:
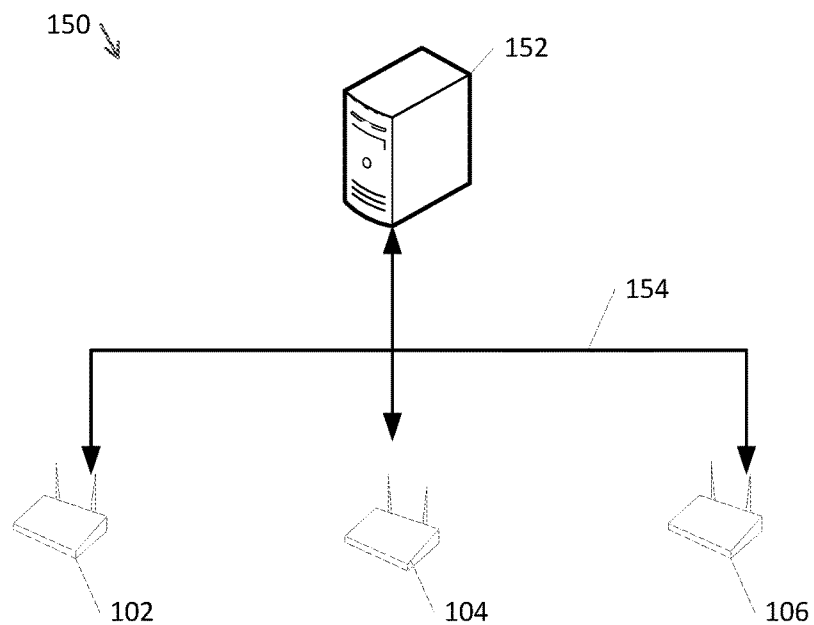
FIG. 1B is an example network diagram of a wireless local area network including a position server.

Referring to FIG. 1B, an example network diagram of a wireless local area network including a position server is shown. The network 150 includes access points 102, 104, 106, a position server 152, and a communication path 154. The position server 152 is a computing device (e.g., network server) including a processor and a memory and is configured to execute computer executable instructions. For example, a position server 152 comprises a computer system including a processor, non-transitory memory, disk drives, a display, a keyboard, a mouse. The processor is preferably an intelligent device, e.g., a personal computer central processing unit (CPU) such as those made by Intel® Corporation or AMD®, a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The position server 152 stores (e.g., in the memory) processor-readable, processor-executable software code containing instructions for controlling the processor to perform functions described herein. The functions may assist in the implementation of a double sided round trip time calibration process. The software can be loaded onto the memory by being downloaded via a network connection, uploaded from a disk, etc. Further, the software may not be directly executable, e.g., requiring compiling before execution. The access points 102, 104, 106 are configured to communicate with the position server 152 to exchange position information via the communication path 154. The communication path 154 can be a wide area network (WAN) and can include the internet. The position server 152 can include a data structure (e.g., relational database, flat files) to store access point information. For example, the position server 152 can include access point position information (e.g., lat./long., x/y), RTT information, timestamp calibration information, and other information associated with an access point (e.g., SSID, MAC address, uncertainty value, coverage area, etc.). An access point 102, 104, 106 can communicate with the position server 152 and can retrieve access point information for use in client station positioning solutions. The configuration of the position server 152 is exemplary only, and not a limitation. In an embodiment, the position server 152 may be connected directly to an access point. More than one position servers may be used. The position server 152 can include one or more databases containing position information associated with other access points on additional networks. In an example, the position server 152 is comprised of multiple server units.

Figure 2:
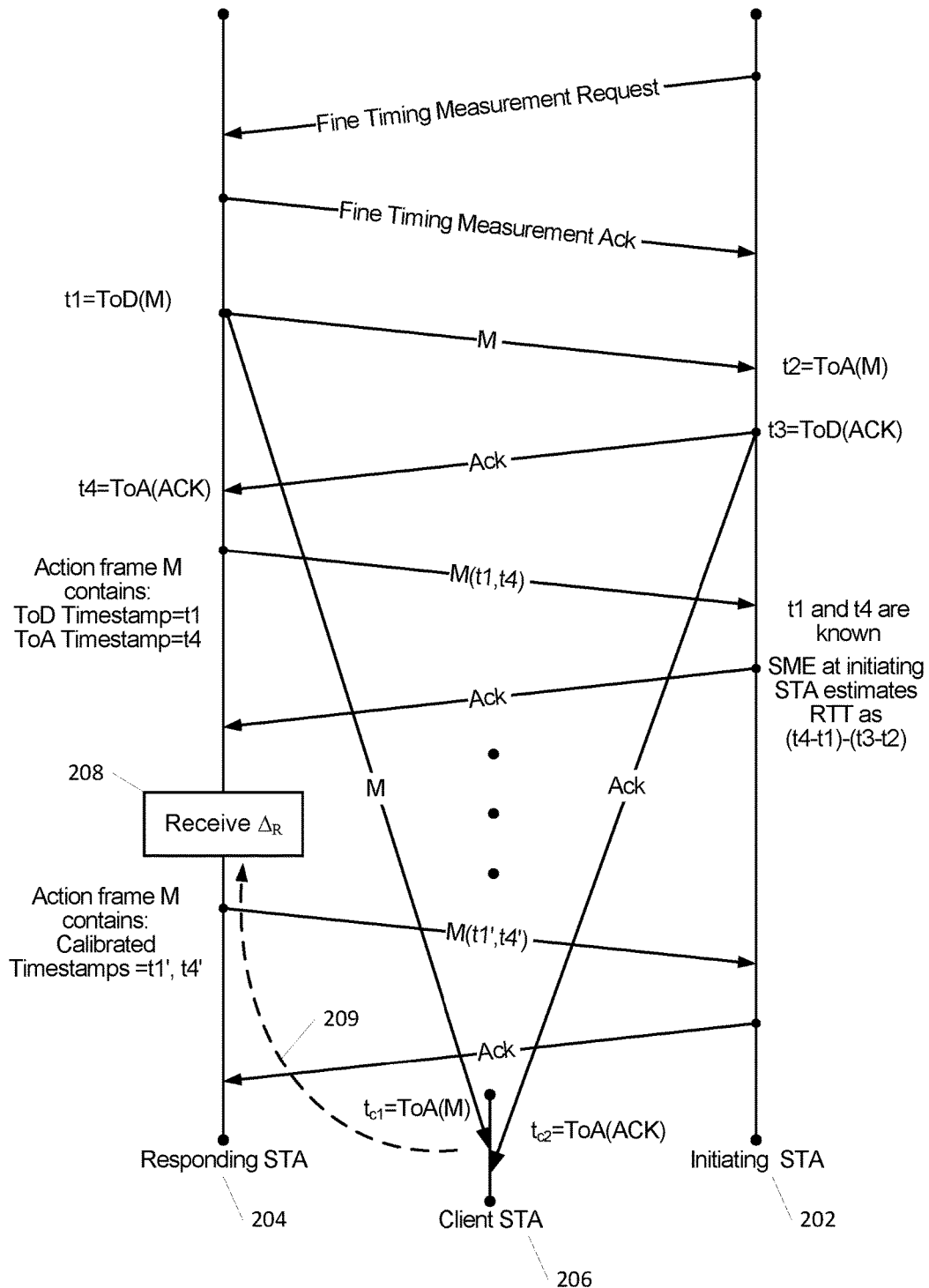
FIG. 2 is an example of a conceptual diagram of a fine timing measurement request.

Referring to FIG. 2, an example of a conceptual diagram of a fine timing measurement request is shown. The general approach includes an initiating station 202, a responding station 204, and a client station 206 located equidistant between the initiating and responding stations. The initiating station 202 can send a fine timing measurement request to the responding station 204 and receive a corresponding acknowledgment message. The responding station 204 then transmits an action frame M at time t1. The action frame M is received by the initiating station 202 at time t2, and an acknowledgment message ACK is transmitted by the initiating station 202 at time t3. The client station 206 can detect the departure of the message M at time t1 (e.g., $t_{c1}$), and the departure of the ACK at time t3 (e.g., $t_{c2}$). The ACK message is received by the responding station 204 at time t4. The responding station 204 then prepares a subsequent message which includes timestamp values for t1 and t4. The initiating station 202 then estimates the RTT as (t4−t1)−(t3−t2). The RTT information may then provided to a client station 206, or to other stations on the network.

While the ideal timestamp values for t1, t2, t3 and t4 are described above, in reality each of these timestamp values includes errors associated with it. Typically, the calibration errors are due to either transmit delay (e.g., t1 and t3) and/or receive delay (e.g., t2 and t4) due to hardware and/or software configurations. Thus, in reality, the ideal values of t1, t2, t3, and t4 can be described as:

$$T_i' = T_i + \Delta_i$$

where:
- $T_i$ is the desired timestamp; and
- $\Delta_i$ is the error associated with the measurement.

Thus, the measured RTT value may be expressed as:

$$RTT' = RTT + \Delta_4 - \Delta_1 + \Delta_2 - \Delta_3$$

Combining the respective timestamp errors for associated with the responding and initiating stations, we can define $\Delta_R = \Delta_4 - \Delta_1$, and $\Delta_I = \Delta_3 - \Delta_2$. Thus, $$RTT' = RTT + \Delta_R - \Delta_I$$

Since the value of the timestamp errors $\Delta_R$ and $\Delta_I$ are related to the hardware and/or software configurations of a station, the RTT based position information in WLANs including multiple stations from multiple vendors (e.g., with different chip sets) may be degraded. To improve the position accuracy of the network, calibration information to correct for transmit and receive delays (e.g., $\Delta_R$ and/or $\Delta_I$ depending on a station's role in a given FTM exchange) may be determined for each station in the network. In an example, the calibration information may be determined for a particular station model and/or hardware configuration and used with other similar station models/configurations. The concepts of passive positioning describe with respect to FIG. 1A may be used to determine the values of $\Delta_R$ and $\Delta_I$. For example, a position equation can be based on the Time of Flight (ToF) between initiating station 202 and the client station 206, and the ToF between responding station 204 and the client station 206. For example, using as the speed of light, the differential distance can be expressed as:

$$\text{Diff\_dist\_IR} = c^*[t_{c1} - t_{c2} - \text{TOF} - (t1 - t4)]$$

where,
- $t_{c1}$ is the Time of Arrival (ToA) of the message M at the client station;
- $t_a$ is the Time of Arrival (ToA) of the Ack message at the client station; and
- TOF is the Time of Flight between the Initiating and Responding stations.

Since the client station 206 is located in the middle of the responding station 204 and the initiating station 202, then the differential time of the signals at the client station 206 will be zero (i.e., Diff_dist_IR=0). Thus, the following quantity is observed:

$$(t_{c1}' - t_{c2}' - T - (t1' - t4')) = 0$$

In reality, the differential difference formula will be:

$$\text{Diff\_dist\_IR} = t_{c1} + \Delta_5 - t_{c2} - \Delta_6 - \text{TOF} - t1 - t4 + \Delta_R$$

where,
- $\Delta_5$ is the error in $t_{c1}$
- $\Delta_6$ is the error in $t_{c2}$ Since the FTM frame and the Ack frame have the same frame format (i.e., $\Delta_5 = \Delta_6$), then:

$$t_{c1}' - t_{c2}' = t_{c1} - t_{c2}$$

The value of TOF between the stations is known and the only remaining unknown is $\Delta_R$. In an example, the median or mean of multiple differential RTT measurements at the client station 206 may be determined as a value of $\Delta_R$. The $\Delta_R$ value may be provided to the responding station 204 at stage 208. For example, the client station 206 may be configured to transmit a wireless communication 209 which includes the $\Delta_R$ value. The differential RTT will provide $\Delta_R$ and the RTT will provide $\Delta_R - \Delta_I$. Thus, under this approach the values for $\Delta_R$ and/or $\Delta_I$, and the corresponding calibration information, may be determined for each station in the network.

Figure 3:
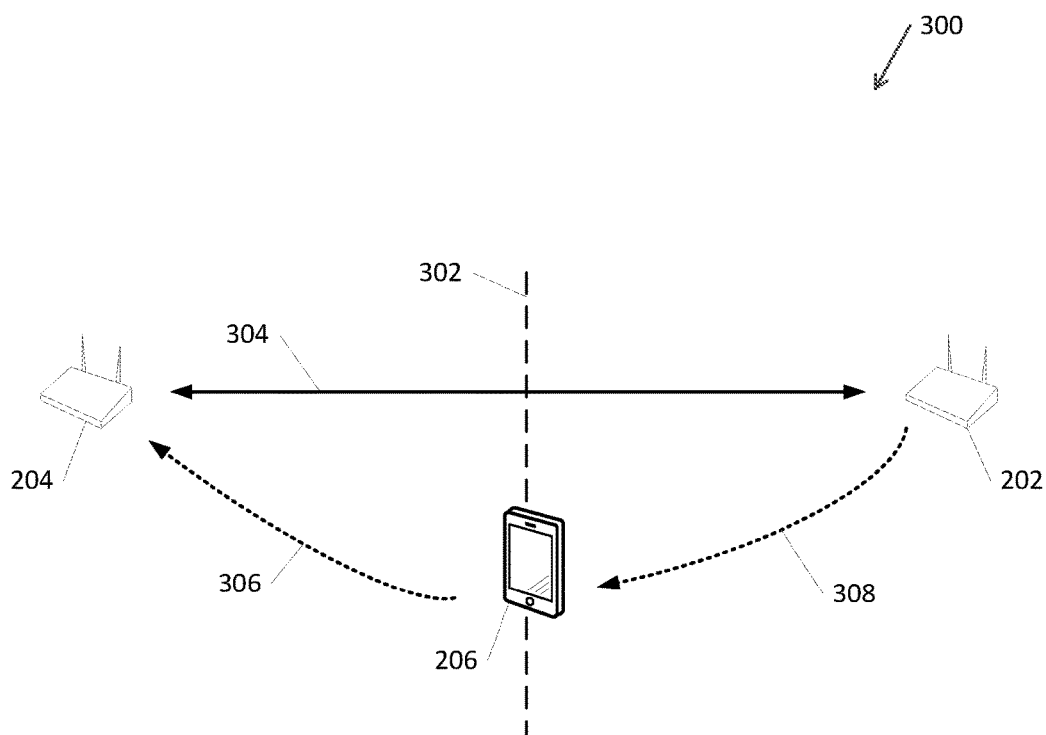
FIG. 3 is an example of a conceptual diagram of a double sided round trip time calibration process.

Referring to FIG. 3, a conceptual diagram of a double sided round trip time calibration process is shown. A wireless network 300 includes an initiating station 202 and a responding station 204 engaging in a FTM exchange 304 (i.e., an exchange of FTM messages). A client station 206 is disposed along a half-way axis 302 comprising locations that are equidistant to both the initiating station 202 and the responding station 204. The client station 206 is configured to intercept the FTM exchange 304 as well as other broadcast messages within the wireless network 300. For example, a station in the wireless network 300 may periodically broadcast neighbor reports including access point data such as identification information, location information, and other data used in passive positioning (i.e., Time Of Flight values between access points). The client station 206 may be configured to obtain multiple differential RTT measurements. The median value of the differential RTT measurements is the value $\Delta_R$ previously described. The client station 206 is configured to relay the value of $\Delta_R$ to the responding station 204 via a first communication 306. The first communication 306 may be a wireless communication between the client station 206 and the responding station 204 such as the wireless communication 209 (e.g., via an in-band communication protocol). In an example, the first communication 306 may be via another access point, network server, or other network communication device (e.g., femtocell, cellular network, wired network connection) such that the $\Delta_R$ value may be associated with the responding station 204 (e.g., via an out-of-band communication with a network server). Other communication paths may also be used to associate the $\Delta_R$ value determined by the client station 206 with the responding station 204.

In operation, the responding station 204 is configured to modify the timestamps it generates based on the $\Delta_R$ value. Specifically, the $\Delta_R$ value is used to calibrate the t1 and t4 timestamps in the FTM exchange 304 with the initiating station 202. In an example, one or more information elements (IE) in a FTM frame may indicate that that the t1 and t4 timestamp values are calibrated. The initiating station 202 may be configured to determine a $\Delta_I$ value based on the calibrated t1 and t4 values. Specifically, since the RTT values between network stations may be known, the initiating station 202 may compare the RTT value computed as a function of the received calibrated t1 and t4 values with a known RTT value. This difference is the $\Delta_I$ value and may be subsequently applied to the t2 and t3 values transmitted by the initiating station 202 in the FTM exchange 304. The $\Delta_I$ value may be provided to the client station 206 via a second communication 308. The second communication 308 may be directly between the initiating station 202 and the client station 206, or indirectly via other network resources such as the position server 152 and another access point. The calibration values for the initiating station 202 and the responding station 204 (i.e., $\Delta_I$ and $\Delta_R$ values, respectively) may be propagated throughout the network by the client station 206 or the position server 152.

Figure 4:
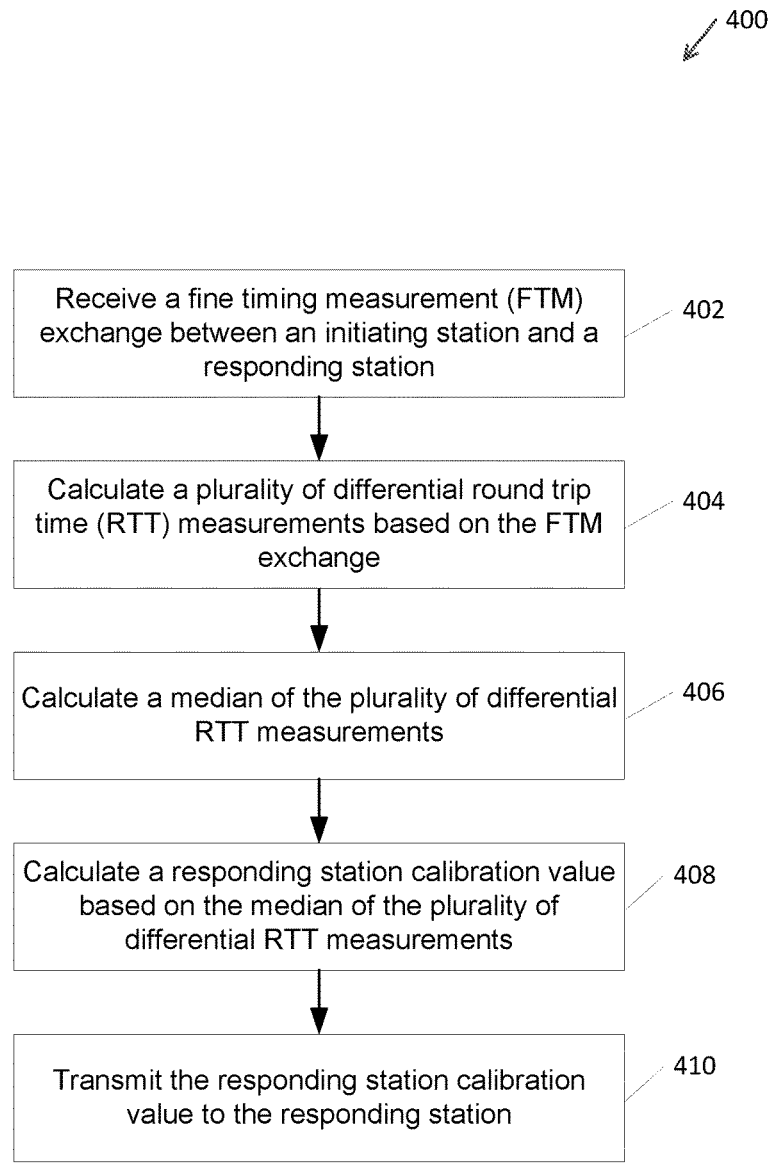
FIG. 4 is flow diagram of a process for calculating a responding station calibration value with a client station.

Referring to FIG. 4, with further reference to FIGS. 1A-3, a process 400 for calculating a responding station calibration value $\Delta_R$ with a client station 206 includes the stages shown. The process 400, however, is exemplary only and not limiting. The process 400 may be altered, e.g., by having stages added, removed, or rearranged. For example, a client station may optionally receive an initiating station calibration value from an initiating station.

At stage 402, a client station 206 is configured to receive a fine timing measurement (FTM) exchange 304 between an initiating station 202 and a responding station 204. The FTM exchange includes timestamp values such as described in established wireless protocols (e.g., draft P802.11REVmc_D5.0). The initiating station 202 and responding station 204 may be from different manufacturers and may have different hardware and/or software configurations. The client station 206 is disposed in a location that is equally distant from each of the initiating station 202 and the responding station 204.

At stage 404, a client station 206 is configured to calculate a plurality of differential round trip time (RTT) measurements based on the FTM exchange. For each FTM exchange, the client station 206 may detect the responding station 204 transmitting an action frame M at time t1. When action frame M is received by the initiating station 202 at time t2, and an acknowledgment message ACK is transmitted by the initiating station 202 at time t3. The client station 206 can determine a time of arrival (ToA(M)) of the message at time $t_{c1}$, and the ToA of the ACK at time $t_{c2}$. The ACK message is received by the responding station 204 at time t4. The responding station 204 transmits a subsequent message which includes timestamp values for t1 and t4. The client station 206 is configured to determine the values of t1, t2, t3 and t4 from the FTM messages, and the values $t_{c1}$ and $t_{c2}$ based on internal timing elements (e.g., an internal clock). A typical FTM session will include three or more such FTM exchanges. The client station 206 is configured to store the respective values of t1, t2, t3, t4, $t_{c1}$ and $t_{c2}$ for each of the exchanges.

At stage 406, a client station 206 is configured to calculate a median of the plurality of differential RTT measurements. For a FTM exchange, the client station 206 is configured to determine a differential RTT value as:

$$\text{Diff\_dist\_}IR = c*[t_{c1} - t_{c2} - \text{TOF} - (t1 - t4)]$$

The TOF value is known based on the distance between the initiating station 202 and the responding station 204. Since the client station 206 is at an equal distance to both the initiating station 202 and the responding station 204, the differential RTT value should be equal to zero. The timestamp errors associated with t1 and t4 (i.e., the responding station 204) will, however, provide a basis for a differential RTT value that is a non-zero value. Each of the FTM exchanges may result in a non-zero differential RTT value, and the client station 206 may be configured to calculate the mean or median of these multiple differential RTT values. At stage 408, the client station 206 may be configured to calculate a responding station calibration value ($\Delta_R$) based on the mean or median of the plurality of differential RTT measurements. In an example, the responding station calibration value ($\Delta_R$) is the median value of the differential RTT measurements. Other statistical methods such as outlier removal and smoothing algorithms may be used on the differential RTT measurements prior to determining the median value and the corresponding responding station calibration value $\Delta_R$.

At stage 410, a client station 206 is configured to transmit the responding station calibration value $\Delta_R$ to the responding station 204. In an example, the client station 206 may be configured to relay the value of $\Delta_R$ to the responding station 204 via a first communication 306. Preferably, the first communication 306 is a wireless transmission or wireless communication between the client station 206 and the responding station 204 (e.g., via the 802.11 or other wireless protocol), and the responding station 204 is configured to calibrate its timestamp upon receipt of the responding station calibration value $\Delta_R$. The first communication 306, however, may be via another access point, network server, or other network communication device (e.g., femtocell, cellular network, wired network connection) such that the $\Delta_R$ value may be associated with the responding station 204 in a database on the position server 152 and provided to the responding station 204 via an out-of-band communication channel.

After stage 410, a client station 206 may optionally be configured to receive an initiating station calibration value $\Delta_I$ from the initiating station 202. The median of differential RTT values determined at stage 406 is used to determine the responding station calibration value $\Delta_R$. The responding station 204 can provide the calibrated values of t1 and t4 to the initiating station. Since the initiating station 202 knows the expected RTT value (i.e., based on the distance from the responding station), the initiating station may determine the $\Delta_I$ value based on the measured RTT value as indicated in the calibrated t1 and t4 timestamps. The initiating station 202 may provide the $\Delta_I$ value to the client station 206 via the second communication 308. The second communication 308 may be directly between the initiating station 202 and the client station 206, or indirectly via other network resources such as the position server 152 and another access point.

Figure 5:
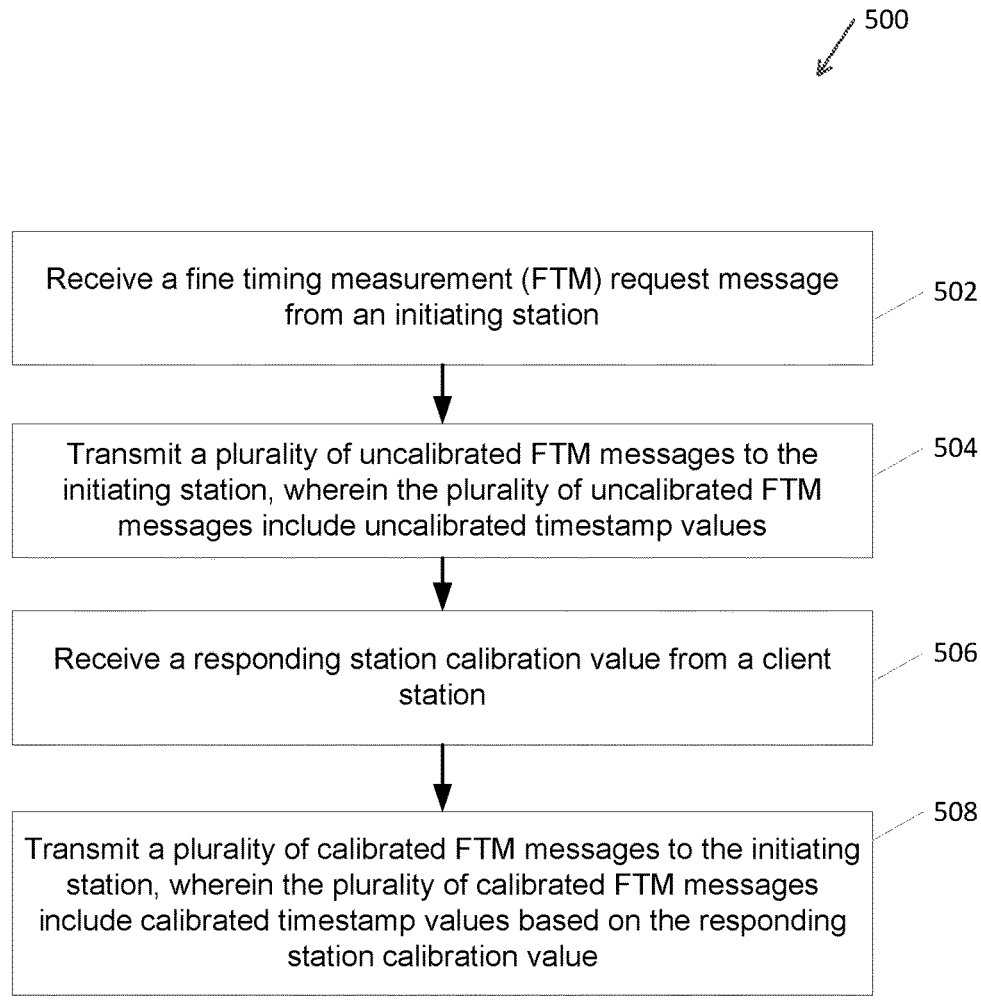
FIG. 5 is flow diagram of a process for calibrating timestamps in a network station.

Referring to FIG. 5, with further reference to FIGS. 1A-3, a process 500 for calibrating timestamps in a network station includes the stages shown. The process 500, however, is exemplary only and not limiting. The process 500 may be altered, e.g., by having stages added, removed, or rearranged. For example, a responding station may receive a responding station calibration value from a client station via an out-of-band communication.

At stage 502, a network station is configured to receive a fine timing measurement (FTM) request from an initiating station. For example, the network station may be an access point such as the responding station 204 and the FTM request may be a FTM request message such as described in the 802.11 protocol (e.g., draft P802.11REVmc_D5.0). The initiating station may be an access point such as the initiating station 202. The network station may be configured to provide an acknowledgement message to the initiating station.

At stage 504, the network station is configured to transmit a plurality of uncalibrated FTM messages to the initiating station, such that the uncalibrated FTM messages include uncalibrated timestamp values. For example, the responding station 204 may transmit an action frame M at time t1. The action frame M is received by the initiating station 202 at time t2, and an acknowledgment message ACK is transmitted by the initiating station 202 at time t3. The ACK message is received by the responding station 204 at time t4. The responding station 204 then prepares a subsequent message which includes timestamp values for t1 and t4. In this example, the values of t1 and t4 are transmitted uncalibrated timestamp values because the network station has yet to receive calibration information.

At stage 506, the network station is configured to receive a responding station calibration value from a client station. The client station may be a mobile device located equidistant from the network station and the initiating station. In an example, the client station 206 intercepts one or more of the plurality of uncalibrated FTM messages transmitted by the network station and determines the responding station calibration value as the value $\Delta_R$. The client station 206 is configured to provide the responding station calibration value to the network station via in-band or out-of-band communication channels. Preferably, the network station is configured to store the responding station calibration value locally. In an example, the responding station calibration value may persist on a network resource such as a position server 152.

At stage 508, the network station is configured to transmit a plurality of calibrated FTM messages to the initiating station, such that the calibrated FTM message include calibrated timestamp values based on the responding station calibration value $\Delta_R$. The calibrated timestamp values t1' and t4' may be determined as:

$$t1'=t1+\Delta_R; \text{ and}$$

$$t4'=t4+\Delta_R$$

The network station may utilize the values t1' and t4' in subsequent FTM messages sent to the initiating station, or in any other station during a FTM exchange. The calibrated timestamp values may be used in other time based positioning methods. The calibrated timestamp values may be used to normalize the performance of access points within a wireless network in view of varying hardware and/or software configuration within the access points.

Figure 6:
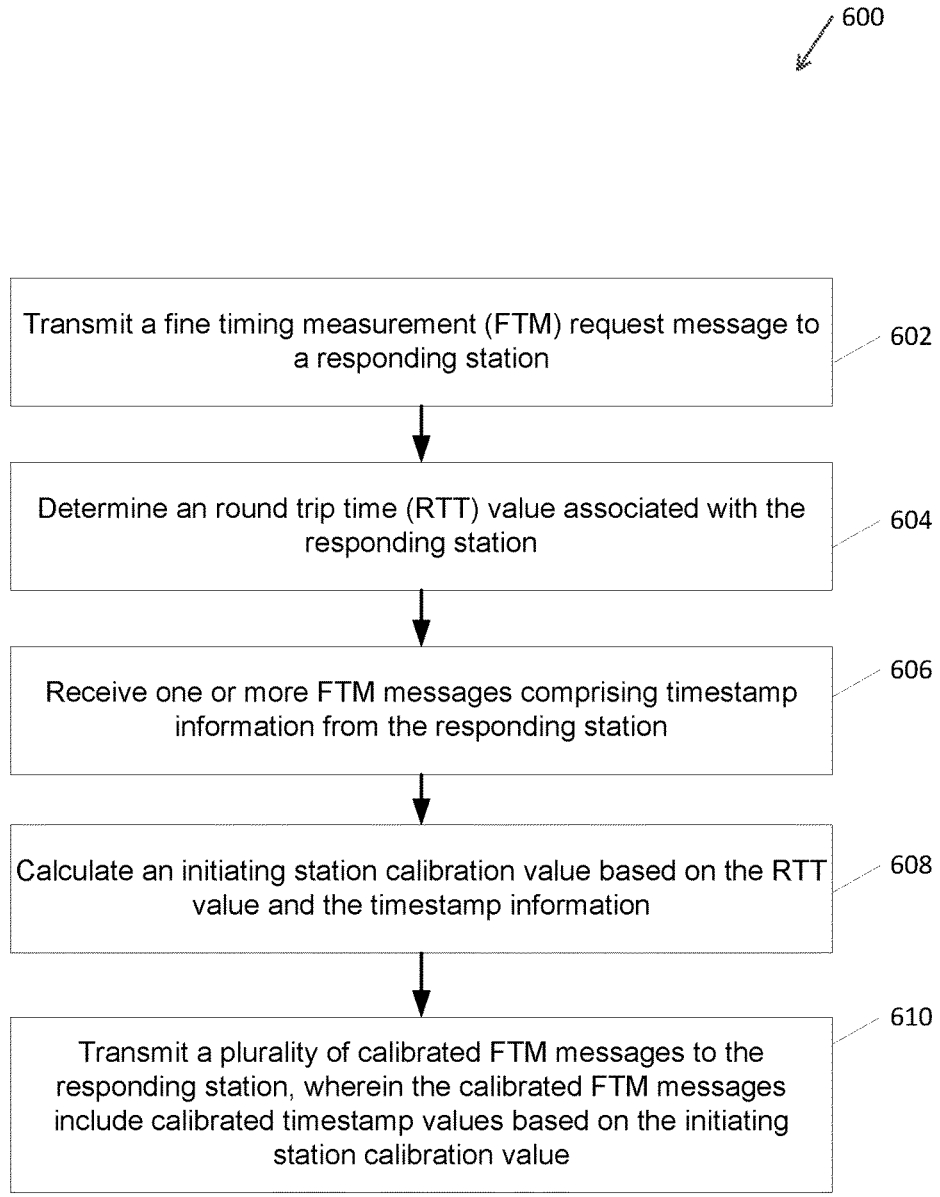
FIG. 6 is flow diagram of another process for calibrating timestamps in a network station.

Referring to FIG. 6, with further reference to FIGS. 1A-3, a process 600 for calibrating timestamps in a network station includes the stages shown. The process 600, however, is exemplary only and not limiting. The process 600 may be altered, e.g., by having stages added, removed, or rearranged. For example, a network station may optionally transmit an initiating station calibration value to a client station.

At stage 602, a network station is configured to transmit a fine timing measurement (FTM) request message to a responding station. For example, the network station may be an access point such as the initiating station 202 and the FTM request message may be a FTM request message such as described in the 802.11 protocol (e.g., draft P802.11REVmc_D5.0).

At stage 604, the network station is configured to determine a round trip time (RTT) value associated with the responding station. The RTT value of two stations in a network may be determined based on the distance between the stations. For example, an advanced WLAN access point may be capable of determining its own position. The location of access points may be included in an almanac on the position server 152, and the network station may determine the RTT value associated with a responding station by querying the almanac with station identification information (e.g., SSID, MAC, BSSID). In an example, a network station may periodically broadcast neighbor reports including RTT information associated with stations in the network.

At stage 606, the network station is configured to receive one or more FTM messages comprising timestamp information from the responding station. The initiating station 202 is configured to participate in a FTM exchange 304 with the responding station 204. The FTM messages includes timestamp values for t1 and t4 as measured and calibrated by the responding station 204.

At stage 608, the network station is configured to calculate an initiating station calibration value based on the RTT value and the timestamp information. The initiating station calibration value $\Delta_I$ may be expressed as:

$$\Delta_I = RTT + \Delta_R - RTT'$$

where,

RTT' is the measured RTT value equal to (t4−t1)−(t3−t2);
RTT is the RTT value determined at stage 604; and
$\Delta_R$ is the responding station calibration value.

Since the $\Delta_R$ is included in the values of t1 and t4 in the FTM messages received by the initiating station 202, the value of $\Delta_R$ can be set to zero (e.g., because of t4−t1 term) and thus:

$$\Delta_I = RTT - RTT'$$

The initiating station calibration value $\Delta_I$ may be stored on the network station (i.e., locally) or may persist on a network resource such as the position server 152.

At stage 610, the network station is configured to transmit a plurality of calibrated FTM messages to the responding station, wherein the calibrated FTM messages include calibrated timestamp values based on the initiating station calibration value $\Delta_I$. The calibrated timestamp values t2' and t3' may be determined as:

$$t2'=t2+\Delta_I; \text{ and}$$

$$t3'=t3+\Delta_I$$

The network station may utilize the values t2' and t3' in subsequent FTM messages to the responding station 204, or to any other station during a FTM exchange. The calibrated timestamp values may be used in other time-based positioning methods. The calibrated timestamp values may be used to normalize the performance of access points within a wireless network in view of varying hardware and/or software configuration within the access points.

The network station may optionally be configured to transmit the initiating station calibration value to a client station 206. The initiating station 202 may provide the $\Delta_I$ value to the client station 206 via the second communication 308. The second communication 308 may be directly between the initiating station 202 and the client station 206, or indirectly via other network resources such as the position server 152 and another access point.

The client station 206 or the position server 152 may be used to propagate the calibration values throughout the network, as well as other networks. In an embodiment, multiple client stations may be used to crowdsource the calibration values for multiple access point manufacturers or various hardware/software configurations which may impact the timestamps generated by the access points. The position server 152 may be configured to store the calibration values in a relational database based on data fields such as manufacturer, model, hardware configuration, and/or software version. The calibration values stored in the position server 152 may be used as the initial calibration values when an access point is installed in a network. These initial calibration values may be subsequently updated using the process described herein. The calibration values may be exported to assist in the passive positioning capabilities of other networks which utilize similar access points (e.g., with similar chip sets).

Figure 7:
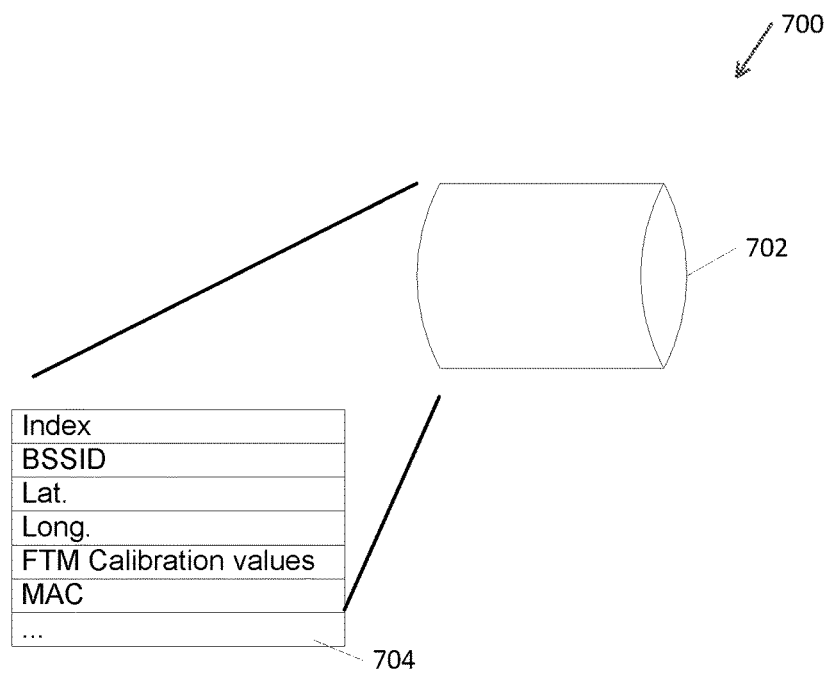
FIG. 7 is an example of a data structure containing FTM calibration values.

Referring to FIG. 7, an exemplary data structure 700 containing FTM calibration values is shown. The data structure 700 is exemplary only and not a limitation as additional tables and fields may be used. The data structure 700 may include a database 702 within the position server 152 or within other storage devices on the network. The database 702 may include one or more tables containing data fields 704 for access point information. The data fields 704 can be data types as known in the art (e.g., number, char, varchar, date, etc. . . . ). The access point information may include multiple fields to represent a network station, such as a base station ID, a SSID, a MAC address of an access point, the latitude and longitude of the station, the coverage area (e.g., footprint) of a station, an uncertainty value, and a detection distribution for the coverage area. Information describing the FTM calibration values (e.g., $\Delta_R$, $\Delta_I$) may be associated with an access point (e.g., via an index, BSSID, MAC address, etc.). Additional tables may be used to store manufacturer information, hardware configurations, software configurations, or other data relevant to the accuracy/compatibility of the timestamps generated by the access point. Thus, the data structure 700 may be used to maintain calibration data across one or more networks and enable statistical analysis of the performance of various hardware configurations.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to execute (e.g., perform) a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8A:
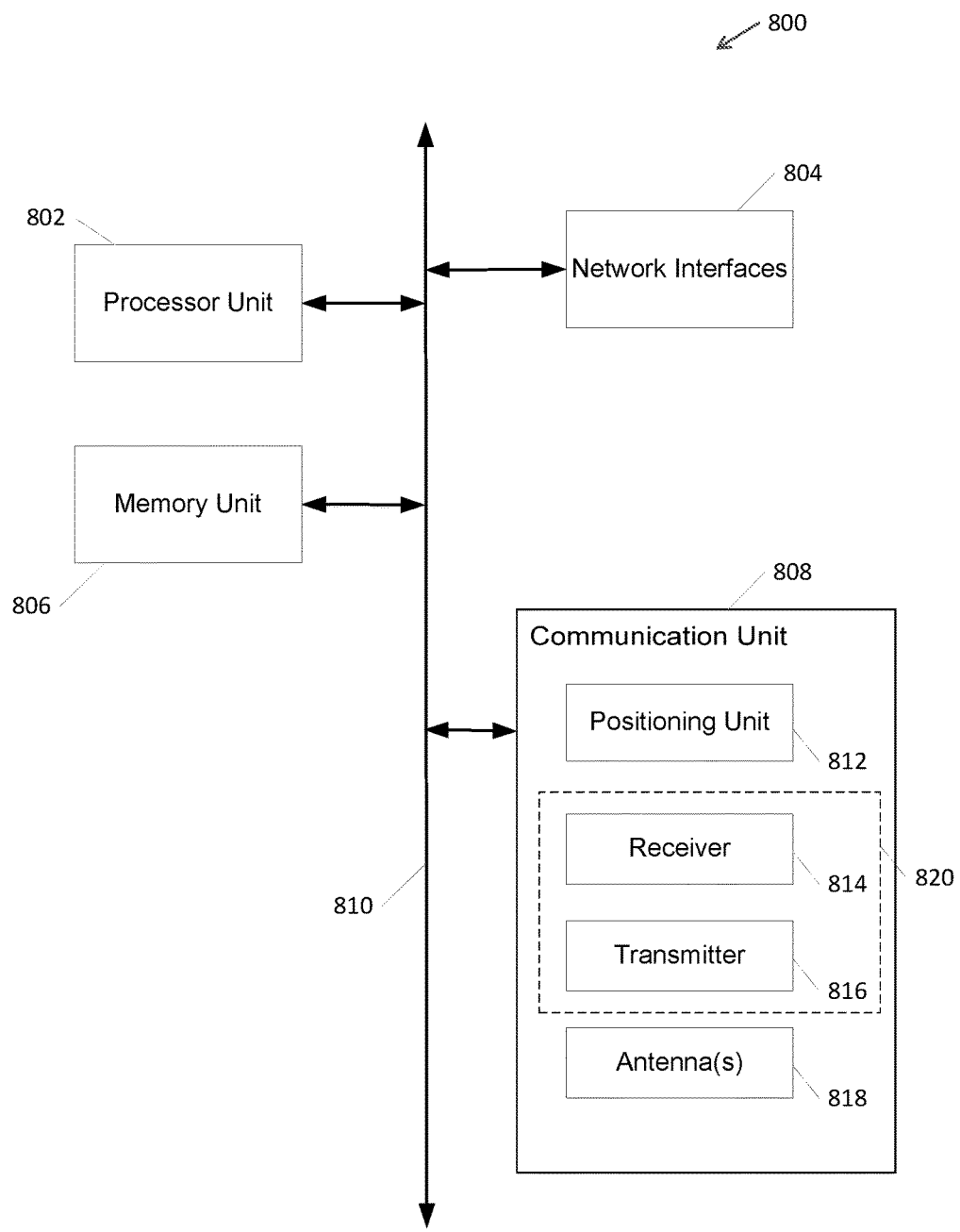
FIG. 8A is a block diagram of an exemplary client station.

Referring to FIG. 8A is a block diagram of one embodiment of an electronic device 800 for use in a double sided round trip time calibration. The client station 206 may be an electronic device 800. In some implementations, the electronic device 800 may be one of a notebook computer, a tablet computer, a netbook, a mobile phone, a gaming console, a personal digital assistant (PDA), an inventory tag, or other electronic systems comprising a WLAN device (e.g., Home Node B (HNB)) with positioning and wireless communication capabilities. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 800 also includes a communication unit 808. The communication unit 808 comprises a positioning unit 812, a receiver 814, a transmitter 816, and one or more antennas 818. The transmitter 816, the antennas 818, and the receiver 814 form a wireless communication module (with the transmitter 816 and the receiver 814 being a wireless transceiver 820). The transmitter 816 and the receiver 814 are configured to communicate bi-directionally with one or more client stations and other access points via a corresponding antennas 818. In some embodiments, the electronic device 800 can be configured as a WLAN client station with positioning capabilities. The positioning unit 812 can detect the fine timing messages exchanged between the access points to determine TDOA timing information associated with the access points. In some embodiments, the access points 102, 104, 106 can also be configured as the electronic device 800 of FIG. 8A. In this embodiment, the access points can use their processing capabilities to execute their respective operations described above. Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8A (e.g., video cards, audio cards, additional network interfaces, peripheral devices, etc.). The processor unit 802, the memory unit 806, and the network interfaces 804 are coupled to the bus 810. Although illustrated as being coupled to the bus 810, the memory unit 806 may be coupled to the processor unit 802.

Figure 8B:
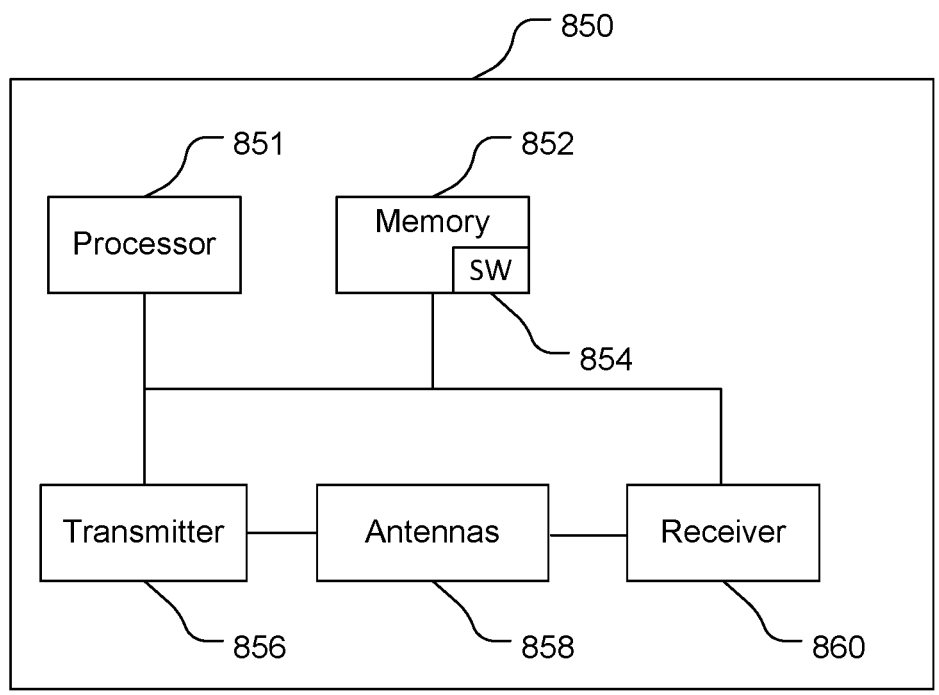
FIG. 8B is a block diagram of an exemplary access point.

Referring to FIG. 8B, an example of an access point 850 comprises a computer system including a processor 851, memory 852 including software 854, a transmitter 856, antennas 858, and a receiver 860. In some embodiments, the access points 102, 104, 106 can also be configured as the access point 850 of FIG. 8B. The transmitter 856, antennas 858, and the receiver 860 form a wireless communication module (with the transmitter 856 and the receiver 860 being a transceiver). The transmitter 856 is connected to one of the antennas 858 and the receiver 860 is connected to another of the antennas 858. Other example access points may have different configurations, e.g., with only one antenna 858, and/or with multiple transmitters 856 and/or multiple receivers 860. The transmitter 856 and the receiver 860 may be a transceiver configured such that the access point 850 can communicate bi-directionally with the client station 120 via the antennas 858. The processor 851 is preferably an intelligent hardware device, e.g., a central processing unit (CPU) such as those made by ARM®, Intel® Corporation, or AMD®, a microcontroller, an application specific integrated circuit (ASIC), etc. The processor 851 could comprise multiple separate physical entities that can be distributed in the access point 850. The memory 852 includes random access memory (RAM) and read-only memory (ROM). The memory 852 is a non-transitory processor-readable storage medium that stores the software 854 which is processor-readable, processor-executable software code containing processor-readable instructions that are configured to, when executed, cause the processor 851 to perform various functions described herein (although the description may refer only to the processor 851 performing the functions). Alternatively, the software 854 may not be directly executable by the processor 851 but configured to cause the processor 851, e.g., when compiled and executed, to perform the functions.

While the embodiments are described with reference to various implementations and exploitations, it will be understood that these embodiments are illustrative and that the scope of the inventive subject matter is not limited to them. In general, techniques for double sided round trip time calibration for wireless communication devices as described herein may be implemented with facilities consistent with any hardware system or hardware systems. Many variations, modifications, additions, and improvements are possible.

The following are examples of apparatuses and processor-readable storage media in accordance with the respective portions of the description above.

1. An apparatus for determining a round trip time calibration value, comprising:
   means for receiving a fine timing measurement (FTM) exchange between an initiating station and a responding station;
   means for calculating a plurality of differential round trip time (RTT) measurements based on the FTM exchange;
   means for calculating a responding station calibration value based on the plurality of differential RTT measurements; and
   means transmitting the responding station calibration value to the responding station.

2. The apparatus of example 1 further comprising means calculating a median of the plurality of differential RTT measurements and means for calculating the responding station calibration value based on the median of the plurality of differential RTT measurements.

3. The apparatus of example 1 wherein the means for transmitting the responding station calibration value to the responding station comprises a wireless communication with the responding station.

4. The apparatus of example 1 wherein the means for transmitting the responding station calibration value to the responding station comprises means for providing the responding station calibration value to a network server.

5. The apparatus of example 1 further comprising means for receiving an initiating station calibration value from the initiating station.

6. The apparatus of example 5 further comprising means for transmitting the initiating station calibration value to the responding station.

7. The apparatus of example 5 further comprising means for providing the initiating station calibration value to a network server.

8. An apparatus for providing calibrated timestamp values in a fine timing measurement (FTM) exchange, comprising:
   means for receiving a fine timing measurement (FTM) request message from an initiating station;
   means for transmitting a plurality of uncalibrated FTM messages to the initiating station, wherein the plurality of uncalibrated FTM messages include uncalibrated timestamp values;
   means for receiving a responding station calibration value from a client station; and
   means for transmitting a plurality of calibrated FTM messages to the initiating station, wherein the plurality of calibrated FTM messages include the calibrated timestamp values based on the responding station calibration value.

9. The apparatus of example 8 wherein the means for receiving the responding station calibration value from the client station comprises means for receiving a wireless transmission from the client station.

10. The apparatus of example 8 wherein the means for receiving the responding station calibration value from the client station comprises means for receiving the responding station calibration value from a network server.

11. The apparatus of example 8 wherein a distance to the initiating station is twice a distance to the client station.

12. The apparatus of example 8 further comprising means for transmitting the responding station calibration value to the initiating station.

13. A non-transitory processor-readable storage medium comprising instruction for determining a round trip time calibration value with a mobile device, comprising:
   code for receiving a fine timing measurement (FTM) exchange between an initiating station and a responding station;
   code for calculating a plurality of differential round trip time (RTT) measurements based on the FTM exchange;
   code for calculating a responding station calibration value based on the plurality of differential RTT measurements; and
   code for transmitting the responding station calibration value to the responding station.

14. The storage medium of example 13 further comprising code for calculating a median of the plurality of differential RTT measurements and code for calculating the responding station calibration value based on the median of the plurality of differential RTT measurements.

15. The storage medium of example 13 wherein the code for transmitting the responding station calibration value to the responding station comprises a code for transmitting wireless communication with the responding station.

16. The storage medium of example 13 wherein the code for transmitting the responding station calibration value to the responding station comprises code for providing the responding station calibration value to a network server.

17. The storage medium of example 13 further comprising code for receiving an initiating station calibration value from the initiating station.

18. The storage medium of example 17 further comprising code for transmitting the initiating station calibration value to the responding station.

19. The storage medium of example 17 further comprising code providing the initiating station calibration value to a network server.

20. A non-transitory processor-readable storage medium comprising instruction for providing calibrated timestamp values in a fine timing measurement (FTM) exchange, comprising:
    code for receiving a fine timing measurement (FTM) request message from an initiating station;
    code for transmitting a plurality of uncalibrated FTM messages to the initiating station, wherein the plurality of uncalibrated FTM messages include uncalibrated timestamp values;
    code for receiving a responding station calibration value from a client station; and
    code for transmitting a plurality of calibrated FTM messages to the initiating station, wherein the plurality of calibrated FTM messages include the calibrated timestamp values based on the responding station calibration value.

21. The storage medium of example 20 wherein receiving the responding station calibration value from the client station comprises receiving a wireless transmission from the client station.

22. The storage medium of example 20 wherein receiving the responding station calibration value from the client station comprises receiving the responding station calibration value from a network server.

23. The storage medium of example 20 wherein a distance to the initiating station is twice a distance to the client station.

24. The storage medium of example 20 further comprising transmitting the responding station calibration value to the initiating station.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

Further, more than one invention may be disclosed.

The invention claimed is:

1. A method of determining a round trip time calibration value with a mobile device, comprising:
    receiving a fine timing measurement (FTM) exchange between an initiating station and a responding station;
    calculating a plurality of differential round trip time (RTT) measurements based on the FTM exchange, wherein each of the plurality of differential RTT measurements being determined as:
    $\text{Diff\_dist\_IR} = c^*[t_{c1} - t_{c2} - \text{TOF} - (t1-t4)]$, wherein
        Diff_dist_IR is a differential distance between the initiating and responding stations;
        c is the speed of light;
        tc1 is a time of arrival (ToA) of a FTM message (M) at the mobile device;
        tc2 is a ToA of an acknowledgement message (Ack) associated with the FTM message at the mobile device;
        TOF is a Time of Flight value based on the distance between the initiating station and the responding station;
        t1 is a time the responding station transmits the FTM message (M);
        t4 is a time the Ack message is received by the responding station;
    calculating a representative value of the plurality of differential RTT measurements;
    calculating a responding station calibration value based on the representative value of the plurality of differential RTT measurements; and
    transmitting the responding station calibration value to the responding station, wherein the representative value is determined by calculating a mean value of the plurality of differential RTT measurements or a median value of the plurality of differential RTT measurements.

2. The method of claim 1 further comprising applying an outlier removal algorithm or applying a smoothing algorithm to the plurality of differential RTT measurements prior to calculating the mean value or the median value of the plurality of differential RTT measurements.

3. The method of claim 1 wherein transmitting the responding station calibration value to the responding station comprises providing the responding station calibration value to a femtocell, wherein the femtocell is configured to provide the responding station calibration value to the responding station via an out-of-band communication channel.

4. The method of claim 1 wherein transmitting the responding station calibration value to the responding station comprises providing the responding station calibration value to a cellular network, wherein the cellular network is configured to provide the responding station calibration value to the responding station via an out-of-band communication channel.

5. The method of claim 1 wherein transmitting the responding station calibration value to the responding station comprises storing the responding station calibration value in a data structure that is operably coupled to the responding station.

6. The method of claim 5 wherein the data structure is included in a position server.

7. The method of claim 6 wherein the data structure includes an initiating station calibration value associated with the initiating station.

8. A method of providing calibrated timestamp values in a fine timing measurement (FTM) exchange, comprising:
    receiving a fine timing measurement (FTM) request message from an initiating station;
    transmitting a plurality of uncalibrated FTM messages to the initiating station, wherein the plurality of uncalibrated FTM messages include uncalibrated timestamp values;
    receiving a responding station calibration value from a client station, the responding station calibration value being based on a representative value of a plurality of differential round trip time (RTT) measurements received on the client station, wherein each of the plurality of differential RTT measurements being determined as:

$$\text{Diff\_dist\_IR} = c^*[t_{c1} - t_{c2} - \text{TOF} - (t1 - t4)], \text{ wherein}$$

Diff_dist_IR is a differential distance between the initiating and responding stations;

c is the speed of light;

tc1 is a time of arrival (ToA) of a FTM message (M) at the client station;

tc2 is a ToA of an acknowledgement message (Ack) associated with the FTM message at the client station;

TOF is a Time of Flight value based on the distance between the initiating station and the responding station;

t1 is a time the responding station transmits the FTM message (M);

t4 is a time the Ack message is received by the responding station; and transmitting a plurality of calibrated FTM messages to the initiating station, wherein the plurality of calibrated FTM messages include the calibrated timestamp values based on the responding station calibration value.

9. The method of claim 8 wherein the representative value is determined by calculating a mean value of the plurality of differential RTT measurements or a median value of the plurality of differential RTT measurements.

10. The method of claim 9 wherein determining the representative value includes applying an outlier removal algorithm or applying a smoothing algorithm to the plurality of differential RTT measurements prior to calculating the mean value or the median value of the plurality of differential RTT measurements.

11. The method of claim 10 wherein receiving the responding station calibration value from the client station comprises receiving the responding station calibration value from a network server via an out-of-band communication.

12. The method of claim 8 wherein receiving the responding station calibration value from the client station comprises providing a base station identification value to a network server and receiving the responding station calibration value from the network server.

13. An apparatus for determining a round trip time calibration value, comprising:
   a memory unit;
   a wireless transceiver;
   a processing unit operably coupled to the memory unit and the wireless transceiver, and configured to:
      receive a fine timing measurement (FTM) exchange between an initiating station and a responding station;
      calculate a plurality of differential round trip time (RTT) measurements based on the FTM exchange, wherein, each of the plurality of differential RTT measurements being determined as:

$$\text{Diff\_dist\_IR} = c^*[t_{c1} - t_{c2} - \text{TOF} - (t1 - t4)], \text{ wherein}$$

Diff_dist_IR is a differential distance between the initiating and responding stations;

c is the speed of light;

tc1 is a time of arrival (ToA) of a FTM message (M) at the wireless transceiver;

tc2 is a ToA of an acknowledgement message (Ack) associated with the FTM message at the wireless transceiver;

TOF is a Time of Flight value based on the distance between the initiating station and the responding station;

t1 is a time the responding station transmits the FTM message (M);

t4 is a time the Ack message is received by the responding station;

calculate a representative value of the plurality of differential RTT measurements, wherein the representative value is determined by calculating a mean of the plurality of differential RTT measurements or a median value of the plurality of differential RTT measurements;

calculate a responding station calibration value based on the representative value of the plurality of differential RTT measurements; and transmit the responding station calibration value to the responding station.

14. The apparatus of claim 13 wherein the processing unit is configured to apply an outlier removal algorithm or apply a smoothing algorithm to the plurality of differential RTT measurements prior to calculating the representative value of the plurality of differential RTT measurements.

15. The apparatus of claim 13 wherein the processing unit is configured to transmit the responding station calibration value to a femtocell, wherein the femtocell is configured to provide the responding station calibration value to the responding station via an out-of-band communication channel.

16. The apparatus of claim 13 wherein the processing unit is configured to transmit the responding station calibration value to a cellular network, wherein the cellular network is configured to provide the responding station calibration value to the responding station via an out-of-band communication channel.

17. The apparatus of claim 13 wherein the processing unit is further configured to store the responding station calibration value in a data structure that is operably coupled to the responding station.

18. The apparatus of claim 17 wherein the data structure is included in a position server.

19. The apparatus of claim 17 wherein the data structure includes an initiating station calibration value associated with the initiating station.

20. A non-transitory processor-readable storage medium comprising instruction for determining a round trip time calibration value with a mobile device, comprising:
   code for receiving a fine timing measurement (FTM) exchange between an initiating station and a responding station;
   code for calculating a plurality of differential round trip time (RTT) measurements based on the FTM exchange, wherein each of the plurality of differential RTT measurements being determined as:

$$\text{Diff\_dist\_IR} = c^*[t_{c1} - t_{c2} - \text{TOF} - (t1 - t4)], \text{ wherein}$$

Diff_dist_IR is a differential distance between the initiating and responding stations;

c is the speed of light;

tc1 is a time of arrival (ToA) of a FTM message (M) at the mobile device;

tc2 is a ToA of an acknowledgement message (Ack) associated with the FTM message at the mobile device;

TOF is a Time of Flight value based on the distance between the initiating station and the responding station;

t1 is a time the responding station transmits the FTM message (M);

t4 is a time the Ack message is received by the responding station;

code for calculating a representative value of the plurality of differential RTT measurements, wherein the representative value is determined by calculating a mean value of the plurality of differential RTT measurements or a median value of the plurality of differential RTT measurements;

code for calculating a responding station calibration value based on the representative value of the plurality of differential RTT measurements; and code transmitting the responding station calibration value to the responding station.

21. The non-transitory processor-readable storage medium of claim 20 further comprising code for applying an outlier removal algorithm or code for applying a smoothing algorithm to the plurality of differential RTT measurements prior to calculating the mean value or the median value of the plurality of differential RTT measurements.

22. The non-transitory processor-readable storage medium of claim 20 wherein the code for transmitting the responding station calibration value to the responding station comprises code for providing the responding station calibration value to a femtocell, wherein the femtocell is configured to provide the responding station calibration value to the responding station via an out-of-band communication channel.

23. The non-transitory processor-readable storage medium of claim 20 wherein the code for transmitting the responding station calibration value to the responding station comprises code for providing the responding station calibration value to a cellular network, wherein the cellular network is configured to provide the responding station calibration value to the responding station via an out-of-band communication channel.

24. The non-transitory processor-readable storage medium of claim 20 wherein the code for transmitting the responding station calibration value to the responding station comprises code for storing the responding station calibration value in a data structure that is operably coupled to the responding station.

25. The non-transitory processor-readable storage medium of claim 24 wherein the data structure is included in a position server.

26. The non-transitory processor-readable storage medium of claim 24 wherein the data structure includes an initiating station calibration value associated with the initiating station.

* * * * *